(12) United States Patent
Kikin-Gil

(10) Patent No.: US 8,279,200 B2
(45) Date of Patent: Oct. 2, 2012

(54) LIGHT-INDUCED SHAPE-MEMORY POLYMER DISPLAY SCREEN

(75) Inventor: Erez Kikin-Gil, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 12/468,742

(22) Filed: May 19, 2009

(65) Prior Publication Data

US 2010/0295820 A1  Nov. 25, 2010

(51) Int. Cl.
*G06F 3/042* (2006.01)
(52) U.S. Cl. ..... 345/175; 345/173; 345/174; 178/18.01; 178/18.09; 715/702
(58) Field of Classification Search .......... 345/173–178; 178/18.01–18.09; 715/702
See application file for complete search history.

(56) References Cited

U.S. PATENT DOCUMENTS

| | | | |
|---|---|---|---|
| 6,275,219 B1 * | 8/2001 | Isenman | 345/173 |
| 2001/0012001 A1 * | 8/2001 | Rekimoto et al. | 345/173 |
| 2005/0285846 A1 * | 12/2005 | Funaki | 345/173 |
| 2006/0257629 A1 * | 11/2006 | Lendlein et al. | 428/195.1 |
| 2007/0247420 A1 * | 10/2007 | Strohband et al. | 345/156 |
| 2008/0027199 A1 * | 1/2008 | Mazurek et al. | 528/10 |
| 2008/0303796 A1 * | 12/2008 | Fyke | 345/173 |
| 2010/0103137 A1 * | 4/2010 | Ciesla et al. | 345/174 |
| 2011/0043454 A1 * | 2/2011 | Modarres et al. | 345/173 |

* cited by examiner

*Primary Examiner* — Amare Mengistu
*Assistant Examiner* — Koosha Sharifi-Tafreshi
(74) *Attorney, Agent, or Firm* — Alleman Hall McCoy Russell & Tuttle LLP

(57) ABSTRACT

A light-induced shape-memory polymer display screen is provided herein. One example display device includes a display screen having a topography-changing layer including a light-induced shape-memory polymer. The display device further includes an imaging engine configured to project visible light onto the display screen, where the visible light may be modulated at a pixel level to form a display image thereon. The display device further includes a topography-changing engine configured to project agitation light of an ultraviolet band towards the display screen, where the agitation light is modulated at a pixel level to selectively change a topography of the topography-changing layer.

20 Claims, 3 Drawing Sheets

LIGHT-INDUCED SHAPE-MEMORY POLYMER DISPLAY SCREEN

BACKGROUND

A computing device with a display screen may be configured to detect touches directed at the display screen. Thus, such a display screen may not only display images to a user but may also visually present a user interface (e.g., a virtual keyboard) with which a user may interact via input touches. Typically, such display screens provide a smooth look and feel to a user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A light-induced shape-memory polymer display screen is provided herein. One example display device includes a display screen having a topography-changing layer including a light-induced shape-memory polymer. The display device further includes an imaging engine configured to project visible light onto the display screen, where the visible light may be modulated at a pixel level to form a display image thereon. The display device further includes a topography-changing engine configured to project agitation light of an ultraviolet band towards the display screen, where the agitation light is modulated at a pixel level to selectively change a topography of the topography-changing layer.

DETAILED DESCRIPTION

The present disclosure relates to display devices configured to include a topography-changing layer in the display screen, where the topography-changing layer includes shape-memory polymers. Such shape-memory polymers are a type of "smart material" capable of being manipulated via external stimuli. More generally, properties (e.g., length, width, shape, etc.) of smart materials may be changed in a controlled manner by external stimuli such as light, electricity, sound, water, temperature, etc. Shape-memory polymers are then a particular subset of smart materials including polymers capable of adjusting their shape by transforming from an original state to a deformed state when induced by an external stimulus. Such shape-memory polymers may be further capable of returning to their original "memorized" state from the deformed state when induced by another external stimulus.

Shape-memory polymers activated by light illumination are called light-induced shape-memory polymers (i.e., light-activated shape-memory polymers). In some cases, these materials may be deformed and fixed into predetermined shapes via ultraviolet light illumination. By including such materials within a display screen, a tangible dimension in the form of a topography-changing layer is included within an otherwise flat display surface. Such a configuration may help provide a natural/tangible user experience, as described in more detail as follows.

Figure 1:
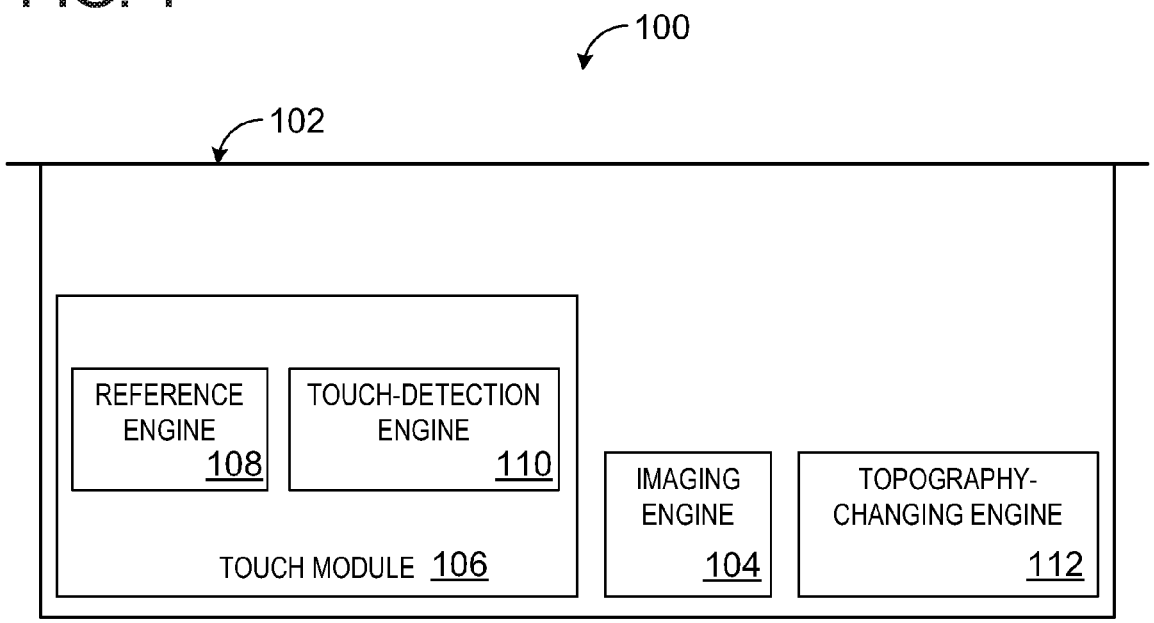
FIG. 1 shows a block diagram of an embodiment of a surface computing system in accordance with the present disclosure.

FIG. 1 shows an embodiment of a surface computing system 100. Surface computing system 100 may include a display device including a projection display system for projecting images from an image source onto a display screen 102. Such a projection display system may include an imaging system, such as imaging engine 104, configured to project visible light onto display screen 102. This visible light may be modulated at a pixel level to form a display image on display screen 102. In other words, each pixel location of the display screen is individually addressable so that a selected color may be displayed at that pixel. In this way, different colors may be projected to the various pixels so that the pixels collectively form a desired image. Examples of imaging engine 104 include an LCD (liquid crystal display), an LCOS (liquid crystal on silicon) display, a DLP (digital light processing) display, and the like.

Surface computing system 100 may further include a touch module 106 for detecting and recognizing touches directed at display screen 102. Touch module 106 may detect and recognize input touches in any suitable manner. As an example, touch module 106 may include a reference engine 108 configured to project reference light towards display screen 102. Such reference light may be of any suitable wavelength, such as light of an infrared band. A touch-detection engine, such as touch-detection engine 110, may then be configured to recognize touch inputs directed at the display by detecting changes in the reflection of the reference light away from a backside of display screen 102 (e.g., as a result of a finger touching a front side of the display screen 102). For example, touch-detection engine 110 may detect a relative amount or pattern of the reference light reflected away from a backside of the display screen. Upon doing so, touch-detection engine 110 may then be further configured correlate the relative amount or pattern of the reference light reflected from the display screen 102 to touch inputs directed to various locations of the display screen. In other words, when an input touch is present on a display screen, reference light directed toward an underside of the display screen may be reflected back away from the display screen at the area of the display screen contacted by the input touch. Accordingly, detecting a relative amount of this reflected light, or a pattern in this reflected light, allows the surface computing system to recognize the presence and location of the input touch on the display screen.

It can be appreciated that touch module 106 may be configured to detect input touches by another suitable method such as capacitive or resistive detection. Another embodiment of an example surface computing system including a projection display system and a touch-detection system is described in more detail with reference to FIG. 6.

Continuing with FIG. 1, display screen 102 may include a clear, transparent portion, such as a sheet of glass, and a diffuser (i.e., a diffuser layer) disposed over the clear, transparent portion. Display screen 102 may further include a topography-changing layer. As described above, the topography-changing layer may be configured to change in topography in response to external stimuli. For example, the topography-changing layer may include light-induced shape-memory polymers, as introduced briefly above. Such light-induced shape-memory polymers may be incorporated into the topography-changing layer in any suitable manner. In some cases, the topography-changing layer may be a deposited layer in that the light-induced shape-memory polymers are deposited, for example, by a spray coating technique. In other cases, light-induced shape-memory polymers having a hexagonal cross-section may be oriented within the topography-changing layer such that the hexagonal cross-section may be parallel to the display screen. Examples of such light-induced shape-memory polymers are described further with reference to FIGS. 2 and 3. Further, in some embodiments, light-induced shape-memory polymers may be substantially transparent to allow transmission of visible light, such as visible light of imaging engine 104, so as not to obstruct formation of images on display screen 102.

Continuing with FIG. 1, surface computing system 100 may further include a topography-changing engine 112 to coordinate activation of the light-induced shape-memory polymers within the topography-changing layer. Topography-changing engine 112 may be configured to project agitation light towards display screen 102. This agitation light may be modulated at a pixel level to selectively change a topography of the topography-changing layer. A light modulator for the agitation may be of any suitable type, such as an LCD, DLP, etc. One approach to modulating the agitation light at a pixel level may include directing agitation light towards a single light-induced shape-memory polymer, where the polymer has a cross-section (e.g., an above-described hexagonal cross-section) defining an area of the topography-changing layer of a same order of magnitude as a pixel. Such a polymer is then independently addressable, in that the agitation light may be directed to that particular polymer independently of other nearby light-induced shape-memory polymers. Accordingly, illumination by the agitation light induces a change in a size of that light-induced shape-memory polymer, thus changing the topography of the topography-changing layer.

The agitation light may be of any suitable wavelength capable of inducing a change in size and/or shape of the light-induced shape-memory polymers present within the topography-changing layer. For example, the light-induced shape-memory polymers may contain cinnamic groups, and may therefore respond to agitation light of an ultraviolet band. Light-induced shape-memory polymers containing cinnamic groups may be configured to include switches responsive to light illumination such as cinnamic acid and cinnamylidene acetic acid. An advantage of using such polymers is that they may be unaffected by light of wavelengths other than ultraviolet. Accordingly, visible light projected and utilized by imaging engine 104 to display images on display screen 102 may not have an adverse effect on the light-induced shape-memory polymers. Likewise, infrared light, such as that projected and utilized by touch module 106 for touch input detection and recognition, may also not adversely affect the light-induced shape-memory polymers.

Such light-induced shape-memory polymers containing cinnamic groups may deform in response to ultraviolet light illumination based on their structure at a molecular level. Such a polymer may have portions of the polymer that respond to ultraviolet light illumination of a first band by bonding to one another. Such polymers may further include connectors that connect these bonded portions together, and are responsible for determining an original shape of the polymers. When the ultraviolet light of a first band is removed, these bonded portions remain, and thus the temporary shape is maintained. However, when the polymer is illuminated with ultraviolet light of a second band, the bonds between these portions are broken, leaving the connectors, and thus causing the polymer to return to its original shape.

Light-induced shape-memory polymers containing cinnamic groups may be formed by any suitable approach. For example, one such approach forms a polymer having a grafted cinnamic group, where a cinnamic acid (CA) is grafted onto the polymer. Such grafted polymers may be obtained by copolymerization of n-butylacrylate (BA), hydroxyethyl methacrylate (HEMA) and ethyleneglycol-1-acrylate-2-CA (HEA-CA) with poly(propylene glycol)-dimethacrylate as crosslinker. Alternatively, another suitable approach for creating a polymer containing a cinnamic group includes forming a permanent network of the polymer from BA with 3.0 wt % poly(propylene glycol)-dimethacrylate as crosslinker. It is to be understood that the above examples are provided as nonlimiting examples, and any suitable light-induced shape-memory polymer may be used without departing from the spirit of this disclosure.

Figure 2:
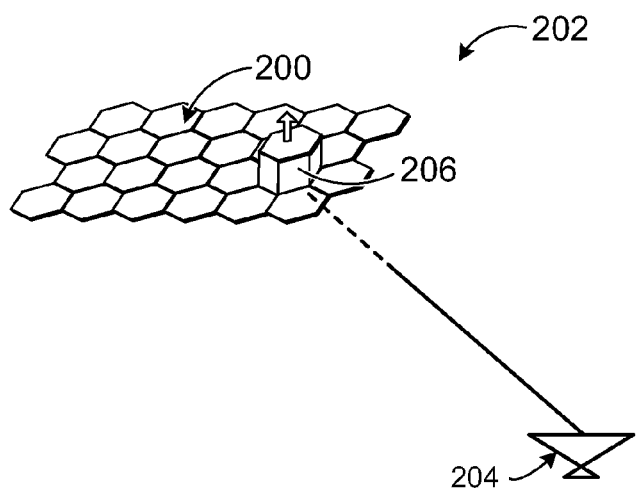
FIG. 2 schematically shows agitation light projected onto a light-induced shape-memory polymer in accordance with an embodiment of the present disclosure.

In some embodiments, such light-induced shape-memory polymers may be configured to expand such that the polymer becomes elongated. FIG. 2 shows an example of light-induced shape-memory polymers 200 of a topography-changing layer of a display screen 202. As depicted, each of the light-induced shape-memory polymers 200 has a hexagonal cross-section parallel to display screen 202. It should be understood that a hexagonal cross-section is shown as an example, and that light-induced shape-memory polymers 200 may have a cross-section of any other suitable shape such as square, rectangular, circular, etc.

As an example, agitation light 204 of an ultraviolet band is directed at one of the polymers, namely light-induced shape-memory polymer 206. Such illumination induces a change in a size of light-induced shape-memory polymer 206 independent of the remaining light-induced shape-memory polymers 200. As depicted, light-induced shape-memory polymer 206 elongates such that a topography of the topography-changing layer of display screen 202 has a vertical rise at the location of light-induced shape-memory polymer 206. In some cases, light-induced shape-memory polymer 206 may undergo such a change in size when illuminated by light of agitation light 204 within a first ultraviolet band. The resulting temporary size/shape of light-induced shape-memory polymer 206 may be sufficiently stable. For example, in some cases temporary shapes of light-induced shape-memory polymers containing cinnamic groups may be stable for long periods of time, even when heated to 50° C. Further, such polymers may return to their original "remembered" state (i.e., contract) when exposed to light of agitation light 204 of a second ultraviolet band. In one particular example, light-induced shape-memory polymers may transform into a temporary shape when illuminated with ultraviolet light of a wavelength longer than 260 nm, and may return back to an original shape when illuminated by ultraviolet light of a wavelength shorter than 260 nm.

In the case of the example depicted in FIG. 2, in response to activation by agitation light 204, light-induced shape-memory polymer 206 expands in length. Such length expansion is shown as an example, in that light-induced shape-memory polymer 206 may instead be configured to expand in width (and optionally height). As an example, FIG. 3 depicts such a case, described as follows.

Figure 3:
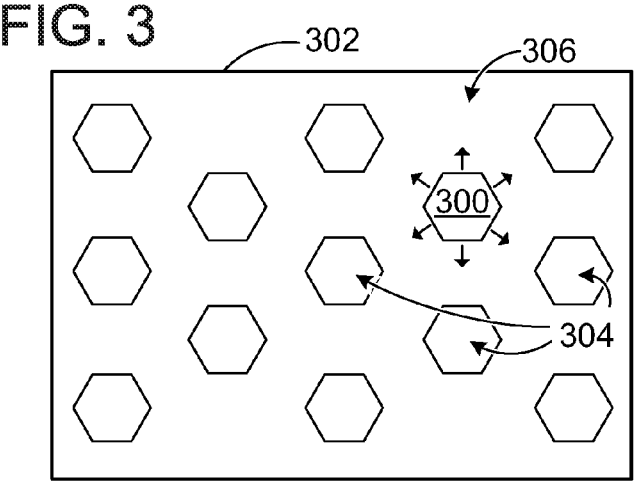
FIG. 3 schematically shows an example embodiment of light-induced shape-memory polymers.

FIG. 3 shows a light-induced shape-memory polymer 300 of a topography-changing layer in display screen 302. As depicted, light-induced shape-memory polymer 300 may be separated from other light-induced shape-memory polymers 304 by a material 306. Material 306 may be configured to contract, to allow for expansion of light-induced shape-memory polymer 300. In some embodiments, material 306 may be optically matched to light induced shape-memory polymers 304 and 300.

Figure 4:
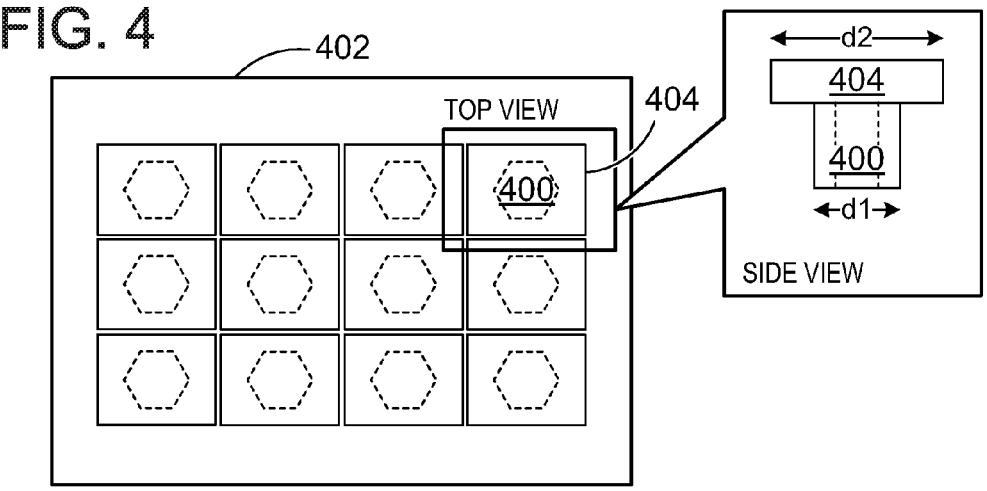
FIG. 4 schematically shows another example embodiment of light-induced shape-memory polymers.

As another example, FIG. 4 shows a light-induced shape-memory polymer 400 of a topography-changing layer in display screen 402. As depicted, light-induced shape-memory polymer 400 may be covered by a transparent cap 404. Such a transparent cap 404 may have a width d2 that is greater than the width d1 of light-induced shape-memory polymer 400. Such a configuration may be useful in the case that light-induced shape-memory polymer 400 is not sufficiently transparent. In such a case, the width d1 of light-induced shape-memory polymer 400 may be significantly smaller than the width of a pixel, so that when light-induced shape-memory polymer 400 is placed at a same location as a pixel, at least some of the visible light directed at the pixel is transmitted around the light-induced shape-memory polymer 400. In other words, reducing the width of light-induced shape-memory polymer 400 increases the amount of light that will reach the viewer. Accordingly, display screen 402 may still present visible images without having to significantly increase the intensity of the visible light projected by the projection/imaging system. By covering light-induced shape-memory polymer 400 with a transparent cap 404, an area having width d2 will be adjusted in the topography-changing layer of display screen 402 via expansion of light-induced shape-memory polymer 400. Such an area may be of a similar size to that of a pixel, although other sizes are within the spirit of this disclosure.

Figure 5:
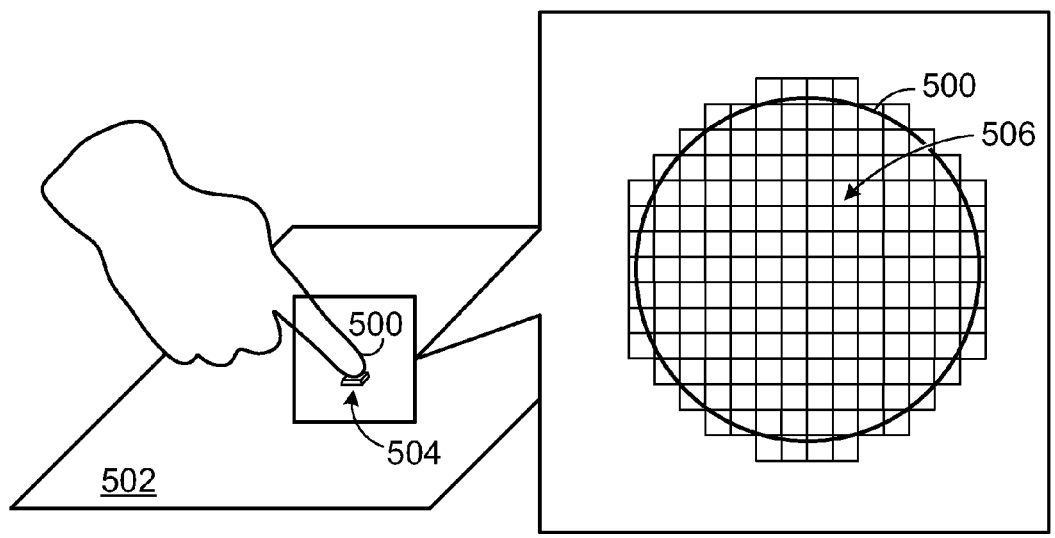
FIG. 5 schematically shows a user interacting with an example display screen having a topography-changing layer.

FIG. 5 schematically shows an example of a user 500 interacting with a display screen 502 having a topography-changing layer. In response to agitation light, light-induced shape-memory polymers of the topography-changing layer have elongated so as to elevate a region 504 having a substantially button-shaped form factor. Region 504 may, for example, be part of a user interface displayed on display screen 502. For example, an image in the shape of a button may be projected onto region 504 so that a button is visible to user 500 at region 504. Further, the raised topography of region 504 may provide a tactile reinforcement that region 504 is currently serving as a virtual button. Finally, a user touch directed to region 504 may be detected, for example as described above, thus allowing the region 504 to provide working button functionality.

As shown in an expanded view, user 500 may touch a pixel region 506 of several pixels. As described above, by having a light-induced shape-memory polymer located at each pixel location and individually addressable by agitation light, elongation of individual light-induced shape-memory polymers may be controlled so as to yield distinct topographies on the topography-changing layer. In this way, virtual buttons or any other tactile element may be dynamically formed on the display screen 502.

Figure 6:
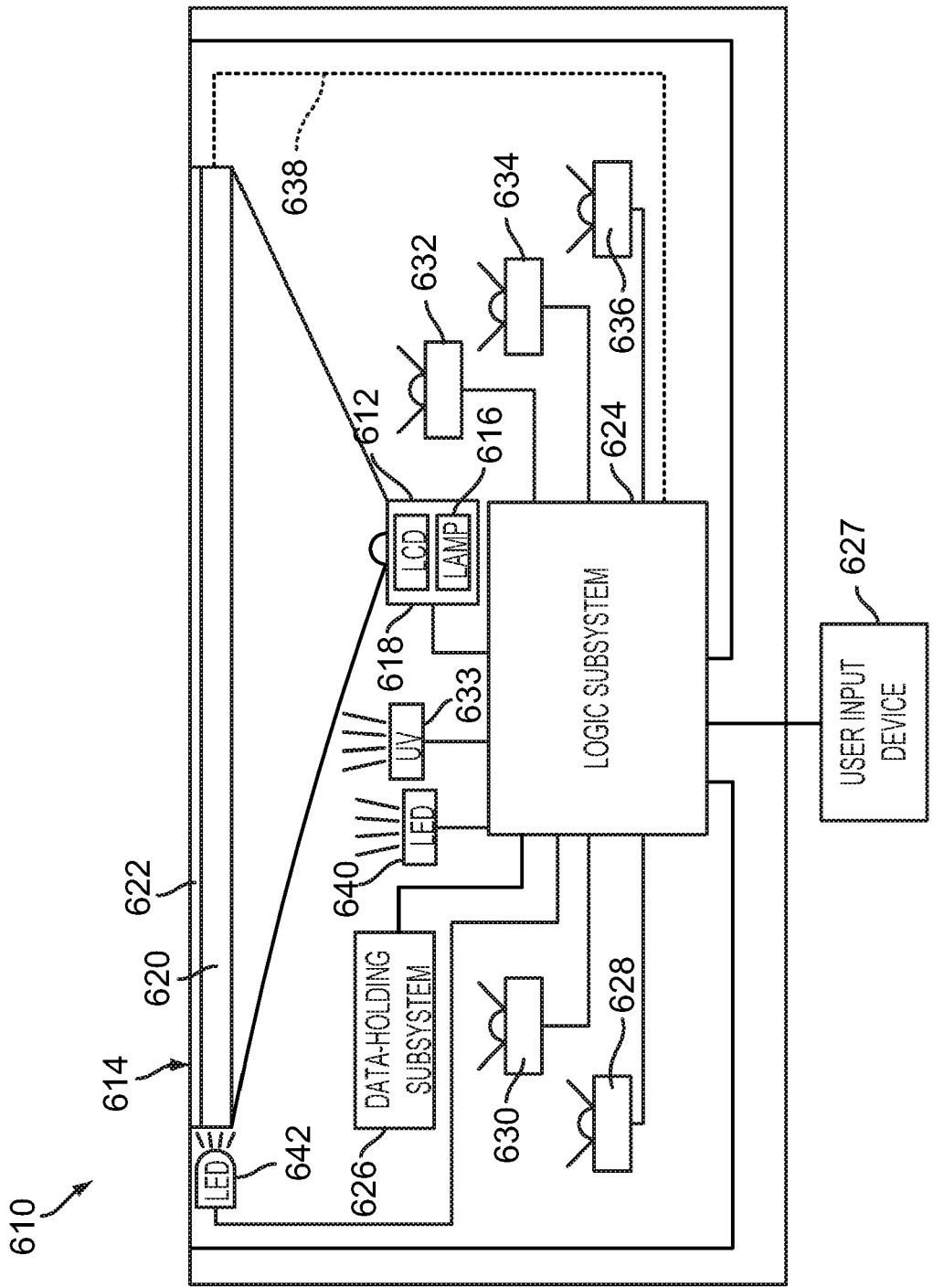
FIG. 6 schematically shows an example embodiment of a surface computing system.

FIG. 6 shows a schematic depiction of an embodiment of an interactive display device in the form of a surface computing system 610. The surface computing system 610 comprises a projection display system having an image source 612, and a display screen 614 onto which images are projected. Image source 612 may be a rear projector that can project images onto display screen 614. Image source 612 may comprise a light source 616, such as the depicted wide-band source arc lamp 616, a plurality of LEDs configured to emit light of three colors (e.g. three primary colors), and/or any other suitable light source. Image source 612 may also comprise an image-producing element 618, such as the depicted LCD (liquid crystal display), an LCOS (liquid crystal on silicon) display, a DLP (digital light processing) display, or any other suitable image-producing element. Image source 612 may be configured to interact with a logic subsystem 624 and/or a data-holding subsystem 626, as described hereafter, to perform functions of an imaging engine, such as imaging engine 104 shown in FIG. 1.

Display screen 614 may include a clear, transparent portion 620, such as a sheet of glass, and a diffuser, referred to herein as diffuser screen layer 622, disposed over the clear, transparent portion 620. In this way, transparent portion 620 and diffuser screen layer 622 can form a non-limiting example of a touch-sensitive region of display screen 614. It will be understood that the diffuser screen layer may either be a separate part from the clear, transparent portion 620, or may be formed in a surface of, or otherwise integrated with, the clear, transparent portion 620. Display screen 614 may further include a topography-changing layer configured to change in topography in response to external stimuli. As described above with reference to display screen 102 shown in FIG. 1, the topography-changing layer may include light-induced shape-memory polymers as described herein.

Surface computing system 610 may further include an agitation light 633, configured to project agitation light of an ultraviolet band (i.e., an external stimuli) towards the display screen. Agitation light 633 may be modulated at a pixel level to selectively change the topography of the topography-changing layer.

Continuing with FIG. 6, surface computing system 610 may further include a logic subsystem 624 and data-holding subsystem 626 operatively coupled to the logic subsystem 624. Logic subsystem 624 may be further configured to execute instructions on data-holding subsystem 626, and operate agitation light 633, as described above with reference to topography-changing engine 112 of FIG. 1. The surface computing system 610 may include a user input device 627, such as a wireless transmitter and receiver configured to communicate with other devices.

To sense objects that are contacting or near to display screen 614, surface computing system 610 may include one or more image capture devices (e.g., sensor 628, sensor 630, sensor 632, sensor 634, and sensor 636) configured to capture an image of the backside of display screen 614, and to provide the image to logic subsystem 624. Accordingly, the image capture devices and logic subsystem 624 may serve as a touch-detection engine, such as touch-detection engine 110 shown in FIG. 1. The diffuser screen layer 622 can serve to reduce or avoid the imaging of objects that are not in contact with or positioned within a few millimeters or other suitable distance of display screen 614, and therefore helps to ensure that at least objects that are touching the display screen 614 are detected by the image capture devices. While the disclosed embodiments are described in the context of a vision-based multi-touch display system, it will be understood that the embodiments may be implemented on any other suitable touch-sensitive display system, including but not limited to capacitive and resistive systems.

The image capture devices may include any suitable image sensing mechanism. Examples of suitable image sensing mechanisms include but are not limited to CCD and CMOS image sensors. Further, the image sensing mechanisms may capture images of the display screen 614 at a sufficient frequency or frame rate to detect motion of an object across the display screen 614. In other embodiments, a scanning laser may be used in combination with a suitable photodetector to acquire images of the display screen 614. Display screen 614 may alternatively or further include an optional capacitive, resistive or other electromagnetic touch-sensing mechanism, which may communicate touch input to the logic subsystem via a wired or wireless connection 638.

The image capture devices may be configured to detect reflected or emitted energy of any suitable wavelength, including but not limited to infrared and visible wavelengths. To assist in detecting objects placed on display screen 614, the image capture devices may further include an illuminant, such as one or more light emitting diodes (LEDs). FIG. 6 shows an infrared light source 640 and an infrared light source 642 configured to produce infrared light. Light from the illuminant may be reflected by objects contacting or near display screen 614 and then detected by the image capture devices. The use of infrared LEDs as opposed to visible LEDs may help to avoid washing out the appearance of projected images on display screen 614.

In some examples, one or more of infrared light source 640 and/or infrared light source 642 may be positioned at any suitable location within surface computing system 610. In the example of FIG. 6, an infrared light source 642 may be placed along a side of display screen 614. In this location, light from the infrared light source can travel through display screen 614 via internal reflection, while some light can escape from display screen 614 for reflection by an object on the display screen 614. In other examples, an infrared light source 640 may be placed beneath display screen 614. Accordingly, infrared light source 640 and/or infrared light source 642 may be configured to interact with logic subsystem 624 and/or data-holding subsystem 626 to perform operations of a reference engine, such as reference engine 108 shown in FIG. 1.

It will be understood that the surface computing system 610 may be used to detect any suitable physical object, including but not limited to, fingers, styluses, cell phones, cameras, other portable electronic consumer devices, barcodes and other optically readable tags, etc.

Logic subsystem 624 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 626 may include one or more physical devices configured to hold data and/or instructions executable by the logic subsystem to implement the herein described methods and processes. When such methods and processes are implemented, the state of data-holding subsystem 626 may be transformed (e.g., to hold different data). Data-holding subsystem 626 may include removable media and/or built-in devices. Data-holding subsystem 626 may include optical memory devices, semiconductor memory devices, and/or magnetic memory devices, among others. Data-holding subsystem 626 may include devices with one or more of the following characteristics: volatile, nonvolatile, dynamic, static, read/write, read-only, random access, sequential access, location addressable, file addressable, and content addressable. In some embodiments, logic subsystem 624 and data-holding subsystem 626 may be integrated into one or more common devices, such as an application specific integrated circuit or a system on a chip.

Data-holding subsystem 626 may be in the form of computer-readable removable media, which may be used to store and/or transfer data and/or instructions executable to implement the herein described methods and processes.

The terms "module" and "engine" may be used to describe an aspect of computing system 610 that is implemented to perform one or more particular functions. In some cases, such a module or engine may be instantiated via logic subsystem 624 executing instructions held by data-holding subsystem 626. It is to be understood that different modules and/or engines may be instantiated from the same application, code block, object, routine, and/or function. Likewise, the same module and/or engine may be instantiated by different applications, code blocks, objects, routines, and/or functions in some cases. Further, a module or engine may include other hardware, firmware, and/or software. Examples of such engines include a touch module, a reference engine, a touch-detection engine, an imaging engine, a topography-changing engine, etc.

An above-described display subsystem of computing system 610 may be used to present a visual representation of data held by data-holding subsystem 626. As the herein described methods and processes change the data held by the data-holding subsystem, and thus transform the state of the data-holding subsystem, the state of the display subsystem may likewise be transformed to visually represent changes in the underlying data. The display subsystem may include one or more display devices utilizing virtually any type of technology. Such display devices may be combined with logic subsystem 624 and/or data-holding subsystem 626 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display device, comprising:
 a display screen having a topography-changing layer including a light-induced shape-memory polymer;
 an imaging engine configured to project visible light onto the display screen, the visible light being modulated at a pixel level to form a display image thereon; and
 a topography-changing engine configured to project agitation light of an ultraviolet band towards the display screen, the agitation light being modulated at a pixel level to selectively change a topography of the topography-changing layer.

2. The display device of claim 1, where the light-induced shape-memory polymer is one of a plurality of light-induced shape-memory polymers, each of the plurality of light-induced shape-memory polymers having a hexagonal cross-section parallel to the display screen.

3. The display device of claim 2, where the hexagonal cross-section of each of the plurality of light-induced shape-memory polymers defines a cross-sectional area of a same order of magnitude as a pixel of the display image.

4. The display device of claim 2, where each of the plurality of light-induced shape-memory polymers is separated from one another within the topography-changing layer by a material optically matched with the plurality of light-induced shape-memory polymers.

5. The display device of claim 2, where each of the plurality of light-induced shape-memory polymers is independently addressable, and where directing the agitation light at one of the plurality of light-induced shape-memory polymers induces a change in a size of that light-induced shape-memory polymer independent of the other light-induced shape-memory polymers.

6. The display device of claim 5, where the agitation light is of a first ultraviolet band and the change in the size of the light-induced shape-memory polymer is an expansion.

7. The display device of claim 6, where the agitation light is of a second ultraviolet band and the change in the size of the light-induced shape-memory polymer is a contraction.

8. The display device of claim 1, where the topography-changing layer is a deposited layer.

9. The display device of claim 1, where the light-induced shape-memory polymer has a grafted cinnamic group.

10. The display device of claim 1, where the light-induced shape-memory polymer is substantially transparent.

11. The display device of claim 1, where the change in the topography of the topography-changing layer is an elevated region having a substantially button-shaped form factor.

12. A surface computing system, comprising:
a display screen having a topography-changing layer including a light-induced shape-memory polymer;
an imaging engine configured to project visible light onto the display screen, the visible light being modulated at a pixel level to form a display image thereon, the display image including a user interface element;
a reference engine configured to project reference light of an infrared band towards the display screen;
a touch-detection engine configured to detect a relative amount or pattern of the reference light reflected back away from the display screen and configured to recognize touch inputs directed to the display screen based on the relative amount or pattern of the reference light reflected back away from the display screen; and
a topography-changing engine configured to project agitation light of an ultraviolet band towards a portion of the display screen displaying the user interface element, the agitation light being aligned with the visible light and modulated at a pixel level to selectively change a topography of the topography-changing layer thereby providing tactile reinforcement to the user interface element.

13. The surface computing system of claim 12, where the light-induced shape-memory polymer has a hexagonal cross-section parallel to the display screen, the hexagonal cross-section defining a cross-sectional area of a same order of magnitude as a pixel of the display image.

14. The surface computing system of claim 12, where the light-induced shape-memory polymer has a grafted cinnamic group.

15. The surface computing system of claim 12, where the light-induced shape-memory polymer is one of a plurality of light-induced shape-memory polymers, and where directing the agitation light at the light-induced shape-memory polymer induces a change in a size of the light-induced shape-memory polymer independent of the other light-induced shape-memory polymers.

16. A surface computing system, comprising:
a display screen having a topography-changing layer including a light-induced shape-memory polymer, the light-induced shape-memory polymer having a grafted cinnamic group and having a hexagonal cross-section parallel to the display screen;
an imaging engine configured to project visible light onto the display screen, the visible light being modulated at a pixel level to form a display image thereon, the display image including a user interface element;
a reference engine configured to project reference light of an infrared band towards a backside of the display screen;
a touch-detection engine configured to detect a relative amount or pattern of the reference light reflected back away from the display screen and configured to recognize touch inputs directed to the display screen based on a relative amount or pattern of the reference light reflected back away from the display screen; and
a topography-changing engine configured to project agitation light of an ultraviolet band towards a portion of the display screen displaying the user interface element, the agitation light being aligned with the visible light and modulated at a pixel level to selectively change a topography of the topography-changing layer by inducing a change in a size of the light-induced shape-memory polymer thereby providing tactile reinforcement to the user interface element.

17. The surface computing system of claim 16, where the hexagonal cross-section of the light-induced shape-memory polymer defines a cross-sectional area of a same order of magnitude as a pixel of the display image.

18. The surface computing system of claim 16, where the light-induced shape-memory polymer elongates from an original size to an elongated size upon being illuminated by agitation light of a first ultraviolet band.

19. The surface computing system of claim 18, where the light-induced shape-memory polymer returns from the elongated size to the original size upon being illuminated by agitation light of a second ultraviolet band.

20. The surface computing system of claim 16, where the light-induced shape-memory polymer is substantially transparent.

* * * * *